United States Patent
Rogalla et al.

(10) Patent No.: US 7,377,165 B2
(45) Date of Patent: May 27, 2008

(54) WHEEL-BALANCING STATION COMPRISING A TILTABLE CLAMPING DEVICE

(75) Inventors: Martin Rogalla, Darmstadt (DE); Dieter Thelen, Modautal (DE)

(73) Assignee: Schenck RoTek GmbH, Darmstadt (DE)

( * ) Notice: Subject to any disclaimer, the term of this patent is extended or adjusted under 35 U.S.C. 154(b) by 246 days.

(21) Appl. No.: 10/529,506

(22) PCT Filed: Sep. 9, 2003

(86) PCT No.: PCT/DE03/02974

§ 371 (c)(1),
(2), (4) Date: Oct. 11, 2005

(87) PCT Pub. No.: WO2004/031717

PCT Pub. Date: Apr. 15, 2004

(65) Prior Publication Data
US 2006/0096373 A1 May 11, 2006

(30) Foreign Application Priority Data
Sep. 27, 2002 (DE) ................................ 102 45 519

(51) Int. Cl.
*G01M 1/02* (2006.01)
(52) U.S. Cl. ...................................................... 73/487
(58) Field of Classification Search .................. 73/487, 73/462, 460, 468, 459; 157/16, 21
See application file for complete search history.

(56) References Cited

U.S. PATENT DOCUMENTS 3,581,576 A    6/1971  Reiser
3,748,910 A *  7/1973  Hofmann ...................... 73/468
4,890,717 A    1/1990  Kane
5,025,662 A *  6/1991  Hultberg ....................... 73/459
5,060,708 A   10/1991  Hansen (Continued)

FOREIGN PATENT DOCUMENTS

DE        1802451       6/1969

(Continued)

OTHER PUBLICATIONS

Brochure B 1026 "Balancing Machine for Vehicle Wheels, Series 40ABBE, 400FBLR, 400RBLR" of Carl Schenck AG.

(Continued)

*Primary Examiner*—Helen Kwok
(74) *Attorney, Agent, or Firm*—Collard & Roe, P.C.

(57) ABSTRACT

A balancing station for positioning and holding a vehicle wheel for the attachment of a balance weight has a clamping device which has at least two mutually opposing jaws designed for pressing against the wheel periphery, the jaws being rotatably mounted around a common clamping axis. At least one jaw is rotatable and movable to and fro in the direction of the clamping axis via a drive. Via a conveyor device the vehicle wheel can be conveyed prone between the jaws of the clamping device. The clamping device can be moved into a tilted position wherein the clamping axis is inclined at an angle of at least 30 degrees from the horizontal out of a basic position wherein the clamping axis of the jaws is aligned substantially horizontally. In this way, weights can be applied particularly ergonomically to the inner face of the wheel.

16 Claims, 5 Drawing Sheets

U.S. PATENT DOCUMENTS

| | | |
|---|---|---|
| 5,649,582 A | 7/1997 | Hjorth-Hansen |
| 6,116,084 A | 9/2000 | Fischer et al. |

FOREIGN PATENT DOCUMENTS

| | | |
|---|---|---|
| DE | 196 11 574 | 5/1997 |
| DE | 196 11 574 C | 5/1997 |
| DE | 19758241 | 7/1999 |
| EP | 0557240 | 8/1993 |
| EP | 1 111 362 A | 6/2001 |
| EP | 1111362 | 6/2001 |
| EP | 1 116 944 A | 7/2001 |
| EP | 1116944 | 7/2001 |

OTHER PUBLICATIONS

International Search Report.

* cited by examiner

WHEEL-BALANCING STATION COMPRISING A TILTABLE CLAMPING DEVICE

CROSS REFERENCE TO RELATED APPLICATIONS

Applicants claim priority under 35 U.S.C. §119 of German Application No. 102 45 519.8 filed Sep. 27, 2002. Applicants also claim priority under 35 U.S.C. §365 of PCT/DE2003/002974 filed Sep. 9, 2003. The international application under PCT article 21(2) was not published in English.

The invention relates to a balancing station for positioning and holding a vehicle wheel for the attachment of a balance weight with a clamping device which has at least two mutually opposing jaws designed for pressing against the wheel periphery, said jaws being rotatably mounted around a common clamping axis, at least one thereof being rotatable and movable to and fro in the direction of the clamping axis by means of a drive, and with a conveyor device by means of which the vehicle wheel can be conveyed prone between the jaws of the clamping device.

A balancing station of the kind stated is known from the brochure B 1026 "Auswuchtmaschine für Auträder, Typenreihe 400ABBE, 400FBLR, 400RBLR" ("Balancing Machine for Vehicle Wheels, Series 400ABBE, 400FBLR, 400RBLR") of Carl Schenck AG concerning a. The known balancing station is designed for balancing vehicle wheels in an industrial production line in which in a plurality of consecutive stations the wheels are measured, their imbalance determined and balanced by the manual attachment of balance weights. The known balancing station has a driven roller line for conveying the wheel in and out and a clamping device for holding the received wheel during attachment of the balance weights and for turning the wheel for the attachment of balance weights in the second balancing plane on the other side of the wheel. A second station is necessary for rotationally adjusting the wheel into the balancing position. For attaching the balance weights the vehicle wheel is also held only in a horizontally prone position so that in the case of an unfavorable location of the balancing point manual attachment of the balance weight becomes difficult and ergonomically unfavorable.

In a device known from DE 196 11 574 C1 for the industrial balancing of motor vehicle wheels the imbalances are measured on two planes and the balancing points are marked on the vehicle wheel. Subsequently the vehicle wheel is transported by means of conveyor rollers into a wheel trough in which it is held in a vertical position. In this position hammer-in weights can be attached to the vehicle wheel. For attaching an adhesive weight in the inside angle of the wheel flange, the securing means of the wheel trough is pivoted around a horizontal axis of 90° by means of a mechanical drive, by which means the wheel is brought into the horizontal position with the wheel's inner surface facing upwards.

From EP 1 116 944 A2 a balancing station with a securing means is known in which the vehicle wheel can be rotated into the respective suitable position for fastening a balance weight. In a first position of the securing means the vehicle wheel is located in a vertical situation for attaching balance weights secured by clips. From the first position the securing means can be moved into a second position. During this the securing means can be rotated in two directions such that in the second position the vehicle wheel adopts a position with the wheel's inner surface facing the operator and tilted backwards away from the operator, this position being particularly favorable for bonding on a balance weight. This known device is less suitable for the automatic conveying in and out of the wheel and requires plenty of room for movement.

The object of the invention is to create a balancing station of the kind mentioned initially which is suitable for use in a balancing line, said balancing station allowing the attachment of the various kinds of balance weights such as integral hammer-in weights, two-part clip weights and adhesive weights in an ergonomically favorable manner and characterized by a reduced requirement for space.

The object is achieved according to the invention in that the clamping device can be moved into a tilted position wherein the clamping axis is inclined at an angle of at least 30° from the horizontal out of a basic position wherein the clamping axis of the jaws is aligned substantially horizontally.

By means of the design of the balancing station according to the invention an additional degree of freedom is created by simple means for positioning the vehicle wheel. By this means it is possible to bring the vehicle wheel for balancing into an ergonomically favorable position for attaching a balance weight irrespective of the type and to hold it in this position.

According to a further development of the invention, the clamping device has a frame with two legs extending in the conveying direction on both sides of the conveyor device, to each of which legs a jaw is attached with the frame being pivotable around a swivel axis running transversely to the clamping axis to bring it into the tilted position. The swivel axis is preferably on the side of the conveyor device facing the operator, so that the wheel within the clamping device is raised during tilting. However, instances of application are conceivable in which it is advantageous if the swivel axis is arranged approximately in the centre of the conveyor device or on the side of the conveyor device facing away from the operator.

A further development of the invention provides that at least one leg extending in the conveying direction can be fastened to the frame in a first and in a second position, the distance between the leg and the opposing leg in the first position being greater than that in the second position. By this means the clamping width of the clamping device can be adjusted by simple means to large differences in wheel diameters, without necessitating a large and complex clamping stroke of the clamping device. For reasons of symmetry it may also be advisable to provide a plurality of fixing positions on the frame for the legs of both jaws.

In order to be able to rotate the vehicle wheel in the balancing station into the appropriate balancing position, according to the invention each of the jaws has two parallel rollers forming a contact surface for the wheel periphery. The rollers of both jaws are also parallel to one another so that the wheel clamped between the jaws does not alter its position in the axial direction during rotation. The rotational adjustment of the wheel into the balancing position can be carried out manually, the clamping pressure of the clamping device being reduced in order to reduce the resistance to rotation. Preferably at least one of the rollers is coupled to a rotary drive in order to allow automatic rotational adjustment of the vehicle wheel into the balancing position. The rotary drive may be arranged in a roller according to the invention. A particularly advantageous rotary drive is a rotating piston air engine with reduction gear because it is of small construction, is inexpensive and cannot overheat.

To measure the wheel's angle of rotation during rotational adjustment, a further development of the invention provides for a measuring device, for example a rotational angle sensor, on a roller. Preferably this is a non-driven roller. This will avoid the measurement sensed at the roller from being falsified by possible drive slip.

A further advantageous development of the invention provides that a jaw of the clamping device is fixed at one end of a shaft which is mounted rotatably and movable longitudinally in a housing, that the shaft is coupled to a rotary drive arranged in the housing and that a yoke is mounted rotatably at the other end of the shaft and transmits to that shaft the movement of a piston rod of a lifting cylinder which is brought to the housing parallel with the shaft. This design allows by simple means the generation of a large clamping stroke, sufficient clamping force and turning of the clamped wheel.

In order to guarantee a parallel alignment of the rollers of both jaws of the clamping device in the end positions, the rotational movement of the jaws is limited by stops in two end positions at rotational angles separated by 180°, in which end positions the axes of the rollers are aligned vertically. The jaw which can be driven rotatably only via a clamped vehicle wheel and not directly can also be fixed according to the invention in the end positions by friction-locking, particularly a means of spring catches, in order to ensure that the parallelism of the rollers of both jaws is retained even after releasing the clamping device or during rotation of the clamped wheel.

The room for movement that is required for turning the vehicle wheel can be provided in a suitable position of the tilt axis by moving the clamping device into the tilted position. However, a relatively steep tilted position is necessary in order to do this. So that turning a wheel is possible even when the clamping device is not tilted, a further development of the invention provides for the conveyor device being arranged on an elevating table and being capable of lowering downwards by lowering the elevating table below the conveying plane. If the lowering stroke of the conveying device is limited, the tilting of the clamping device and the lowering of the conveying device may be combined such that the required space to move is made available for turning the wheel. The combination of both movements may also be advantageous for reducing the clock time required for this procedure.

The conveyor device according to the invention can comprise two or more conveyor belts or similar continuous conveyor elements arranged at a distance from one another. The conveyor belts or similar continuous conveyor elements can be positioned adjacent to a plurality of transport rollers with rotational axes parallel to the conveyor belts or conveyor elements, the transport rollers being mounted on a lift bolster which is movable into a lower position wherein the transport rollers are provided below the conveying plane of the conveyor device and is movable into an upper position in which the transport rollers protrude beyond the conveying plane of the conveyor device. The transport rollers have the task, during clamping, of facilitating the displacement of the wheel in the direction of the clamping axis. For this purpose they are driven into the upper position. The lower position of the transport rollers is necessary in order to facilitate the conveyance in and out of the wheel with the help of the conveyor device.

The lift bolster on which the transport rollers are mounted is arranged according to the invention on the elevating table of the conveyor device so that with the lowering of the elevating table the lift bolster is also lowered with the transport rollers.

According to a further development of the invention a fence roller may be arranged at the leading and/or trailing edge of the conveyor device so that the wheel does not twist on being conveyed in and, if necessary, on being conveyed out.

The invention is described in more detail hereunder by reference to embodiments as shown in the drawings.

Figure 1:
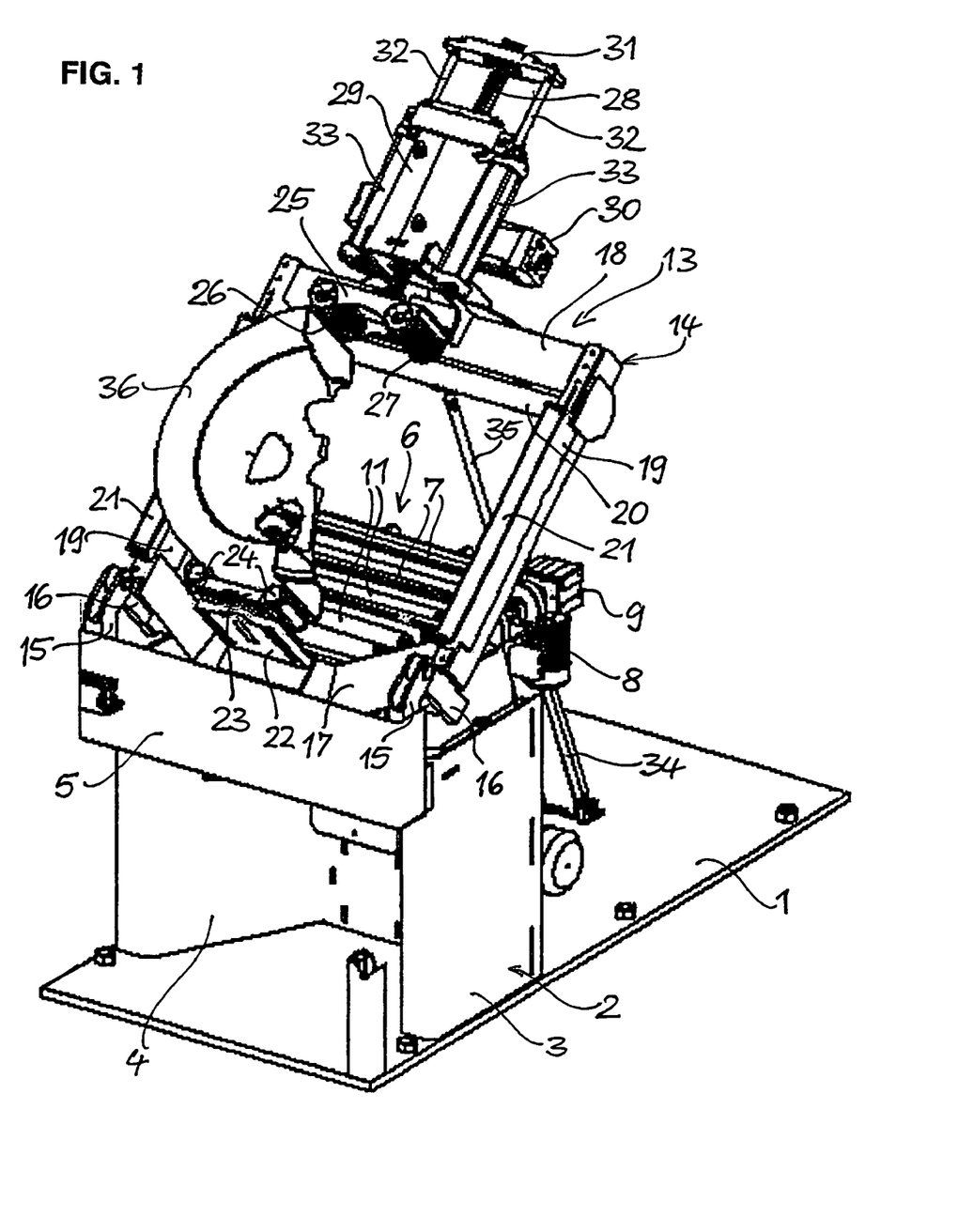
FIG. 1 is a perspective view of an embodiment of a balancing station according to the invention.

The balancing station shown in FIG. 1 is designed for use in a plant comprising a plurality of stations for balancing motor car wheels. The balancing station has a base plate 1 and a rack 2 arranged thereon. Rack 2 has two parallel side walls 3, to which neighboring stations or input and output conveyors may be connected. There is a cover 5 at the front side 4 of rack 2.

Rack 2 supports on its upper side a conveyor device 6 with a conveyor belt parallel to base plate 1. The conveyor device 6 has three conveyor belts 7 arranged at a distance from one another and led via guide pulleys arranged on both sides of the rack 2. For driving the conveyor belts 7 a drive motor 8 is provided with bevel gears 9. The conveyor device 6 is attached to an elevating table 10 arranged in the rack 2. With the aid of the elevating table 10 the height of the conveyor belt can be adapted to adjacent stations and the conveyor device 6 can be lowered below the level of the conveyor belt or raised above the level thereof. The drive of the elevating table 10 may be electrical or pneumatic in design.

Figure 2:
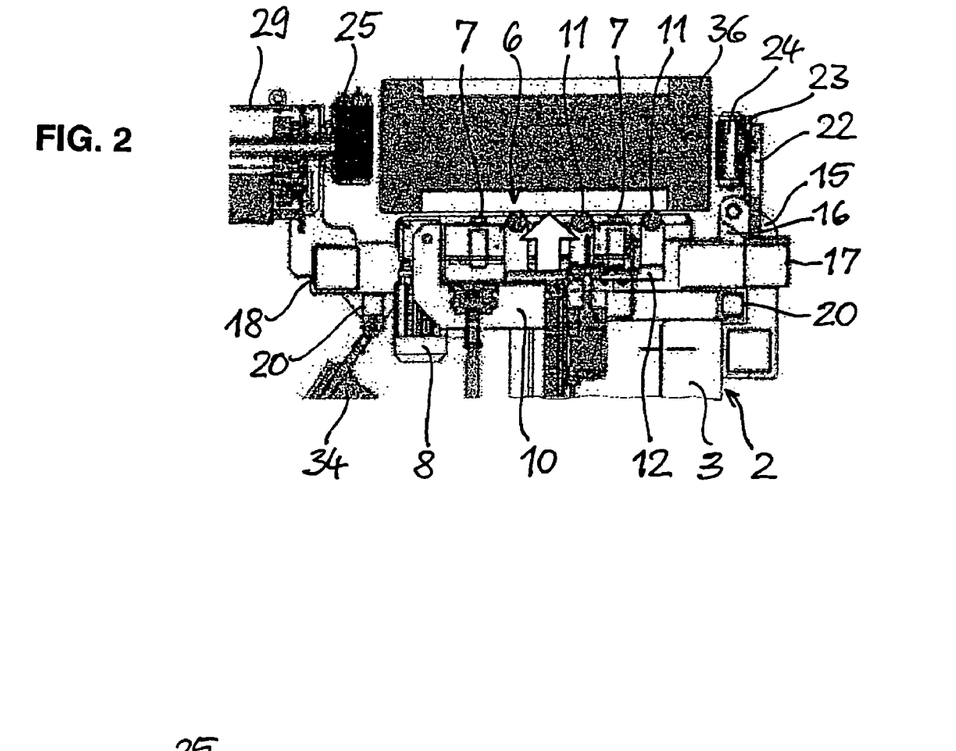
FIG. 2 is a sectional view of the balancing station according to FIG. 1, FIGS. 3a and 3b show the conveyance inward and outward of a wheel at the balancing station according to FIG. 1, FIGS. 4a and 4b show the clamping and unclamping of a wheel at the balancing station according to FIG. 1, FIGS. 5a and 5b show the lowering and raising of the elevating table at the balancing station according to FIG. 1, FIGS. 6a and 6b show the turning and re-turning of a wheel at the balancing station according to FIG. 1.

Next to each conveyor belt 7 of the conveyor device 6 there is a transport roller 11 with a rotational axis parallel to the longitudinal direction of the conveyor belt 7. The transport rollers 11 are mounted jointly, as seen in FIG. 2, on a lift bolster 12. The lift bolster 12 is mounted on the elevating table 10, being adjustable in height, and abuts against it. It can be brought into a lower position in which the transport rollers 11 are below the conveying plane of the conveyor device 6. The conveyor device 6 can therefore convey a vehicle wheel in and out unhindered in this position of the lift bolster 12. By means of a drive, the lift bolster 12 can be raised into an upper position in which the transport rollers 11 protrude beyond the conveying plane of the conveyor device 6. In this position a wheel located in the balancing device can be moved on the transport rollers 11 transversely to the conveyor device.

A clamping device 13 is arranged on the rack 2 for rigidly clamping a vehicle wheel for the attachment of balancing weights. The clamping device 13 has a frame 14 encompassing the conveyor device 6, said frame 14 being mounted pivotably on the rack 2. The rack 2 has for this purpose two bearing pedestals 15 which are fastened to the front end faces of side walls 3. Straps 16 are arranged on the frame 14. The straps 16 are mounted rotatably in the bearing pedestals 15 around a swivel axis parallel to the base plate 1.

The frame 14 has a substantially rectangular form and has a front leg 17, a rear leg 18 and two lateral legs 19. The two lateral legs 19 are also rigidly connected to one another below the front and rear legs 17, 18 by girders 20, 21. The front leg 17 and the rear leg 18 are connected to the lateral legs 19 and easily detachable by means of screws or also other suitable means and can be fastened to the lateral legs 19 at a greater or lesser distance from the conveyor device 6.

A fence roller 21 is arranged on the upper side of the lateral legs 19, said fence roller 21 being aligned parallel to the rotational axes of conveyor device 6 in the normal position of frame 14 shown in FIG. 2, and touches the conveying plane of the conveyor device 6. The fence rollers 21 ensure that the wheel does not twist when being conveyed inward and outward.

In the centre of the front leg 17 a projecting plate 22 is attached on which a jaw 23 is mounted rotatably and whose height can be adjusted. On the jaw 23 are two parallel rollers 24 arranged at a distance from one another which form the contact surface for the periphery of the vehicle wheels to be balanced. Between the plate 22 and the jaw 23 a spring catch device is effective which holds the jaws 23 in a position on the plate 22 in which position the rollers 24 are vertically aligned. If the jaw 23 is rotated while overcoming the holding force of the spring catch device, said jaw 23 is caught and arrested by the spring catch device again on reaching the rotational angle of 180°.

At the rear leg 18 a jaw 25 opposing the jaw 23 is held with two parallel rollers 26, 27 arranged at a distance from one another. The jaw 25 is fastened at the end of a shaft 28 which is mounted axially displaceably and rotatably in a housing 29 which is rigidly connected to the leg 18. The housing 29 is attached to the leg 18 and its height can be adjusted. On the housing 29 there is a rotary drive 30 by which means the shaft 28 can be rotated through at least 180°. By means of the rotary drive 30 the jaw 25 can be arrested in two positions in which the rollers 26, 27 are parallel to the rollers 24 of the jaw 23 when it is in the locked-in position. Inductive proximity switches at the shaft can monitor whether the two positions are reached.

The end of the shaft 28 opposing the jaw 25 protrudes from the housing 29 and is mounted rotatably in a yoke 31. The two ends of the yoke 31 are each connected to a piston rod 32 of a pneumatic lifting cylinder 33 fixed laterally to the housing 29. By activating the two lifting cylinders 33 the yoke 31 can be pulled towards the housing 29 by which means the shaft 28 is displaced axially inside the housing 29 and the jaw 25 is moved in the direction of the jaw 23. If a vehicle wheel is between the jaws 23 and 25, it can be clamped rigidly between the jaws 23, 25 in the manner described by activating the lifting cylinder 33.

In the roller 26 of the jaw 25 there is a rotary drive in order to be able to rotationally adjust a clamped wheel into the balancing position by driving the roller 26. Preferably a rotating piston air engine is used as rotary drive because it is small in construction and cannot overheat. To measure the angle of rotation of the wheel rotation a rotational angle sensor is arranged in the roller 27.

As shown in FIG. 1, the frame 14 of the clamping device 13 can be moved into a tilted position in which the clamping axis formed by the common rotational axis of the jaws 23, 25 is inclined to the horizontal conveying plane of the conveyor device 6. The tilting movement of the frame 14 is effected with the aid of a lifting cylinder 34 which is mounted pivotably on the base plate 1 and the piston rod 35 is of which is articulated to the rear girder 20 of frame 14. The described practical embodiment is designed such that the frame 14 can be tilted up to a 45° angle of inclination of the clamping axis.

Below there is a more detailed description of the functions fulfilled by the described balancing apparatus within a production line for the manual balancing of vehicle wheels.

Figure 3A:
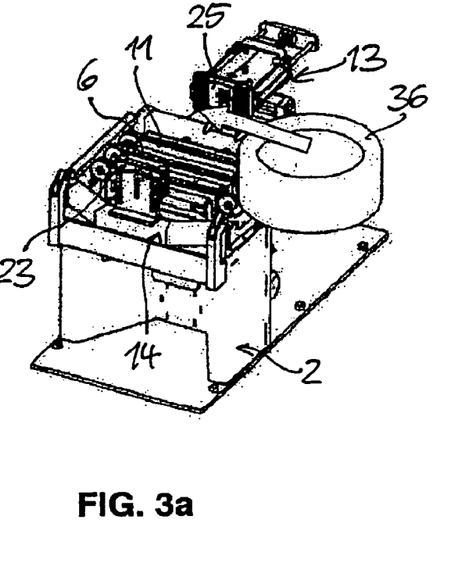
Figure 3B:
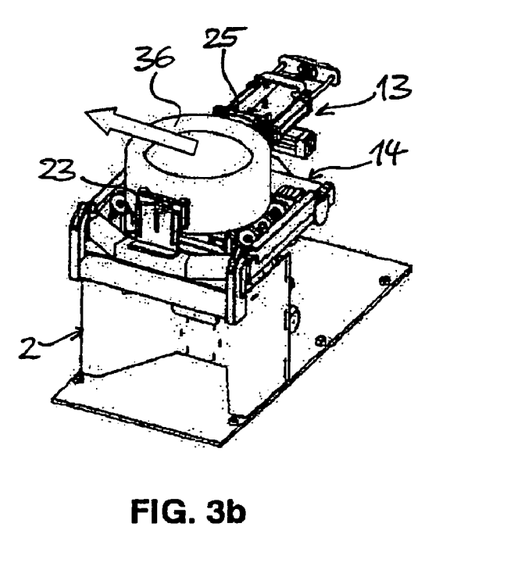

FIGS. 3a and 3b illustrate the conveyance inward and outward of a wheel 36. For this purpose the conveyor device 6 is located in the envisaged conveying plane. The elevating table with the transport rollers 11 is lowered into the lower position. The jaws 23, 25 of the clamping device 13 are separated and the frame 14 is in its normal horizontal position.

Before the inward conveyance the imbalance of the wheel was measured and the wheel 36 was rotationally adjusted into the balancing position for the upper balancing plane. This rotational position is retained during conveyance inward so that the wheel 36 is now in the correct position in the balancing device for balancing on the first plane.

To clamp the inward-conveyed wheel 36 the lift bolster 12 and the transport rollers 11 are driven into the upper position. By this means the wheel 36 is raised from the conveyor device 6. This is shown in FIG. 2. Additionally if necessary the wheel 36 can still be raised slightly higher with the aid of the elevating table 10 if the dimension of the wheel requires this.

Figure 4A:
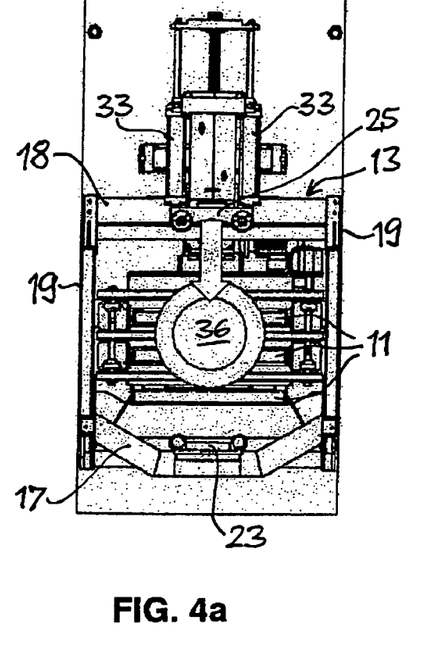
Figure 4B:
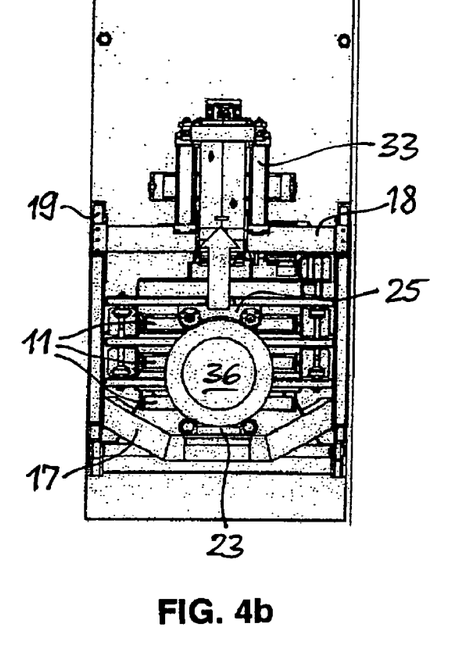

In FIGS. 4a and 4b, the clamping and unclamping of a wheel is shown. In the illustration in FIG. 4a the front leg 17 and the rear leg 18 are each in the retracted fixing position which is required for wheels of larger diameters. For the small wheel 36 illustrated in this position of the leg 17, 18 the rise/fall of the clamping device 13 is insufficient, however, to reach the clamping position. Both legs 17, 18 were therefore initially detached at the lateral legs 19 and refastened to them in a position displaced forward towards the centre. The refitted state is shown in FIG. 4b. After refitting, the jaw 25 is extended by activating the lifting cylinder 33 and through this the wheel 36 is pressed onto the jaw 23, wherein it rolls off the transport rollers 11 and by this means retains its rotationally adjusted position. The clamping pressure can be regulated by means of the pressure induced in the lifting cylinder 22.

Once the wheel is clamped it is possible to attach the balancing weight in the first plane.

Figure 5A:
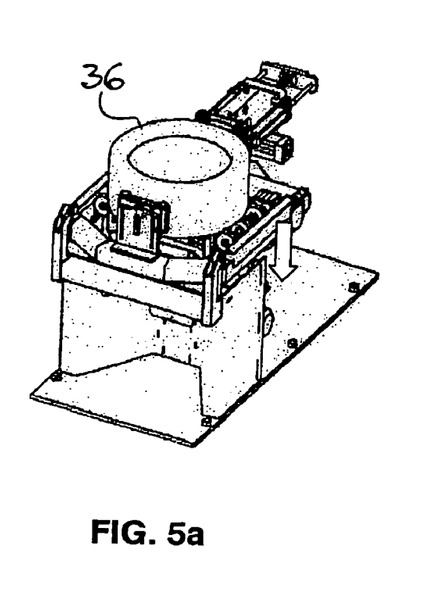
Figure 5B:
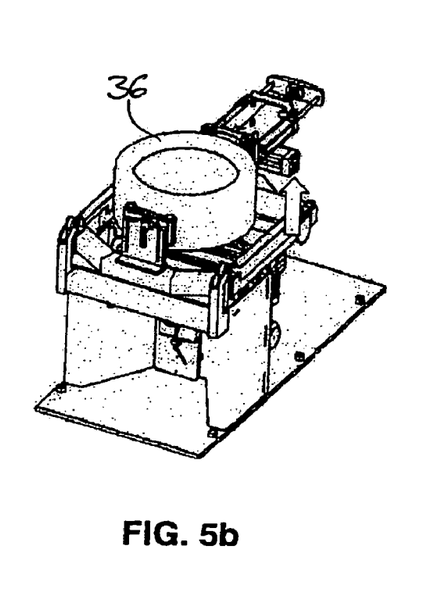

For balancing the imbalance in the second plane the wheel 36 has to be turned so that this plane becomes accessible. The space required for turning is created by lowering the elevating table 10 with the conveyor device 6 arranged thereon, see FIGS. 5a and 5b.

Figures 6A, 6B:
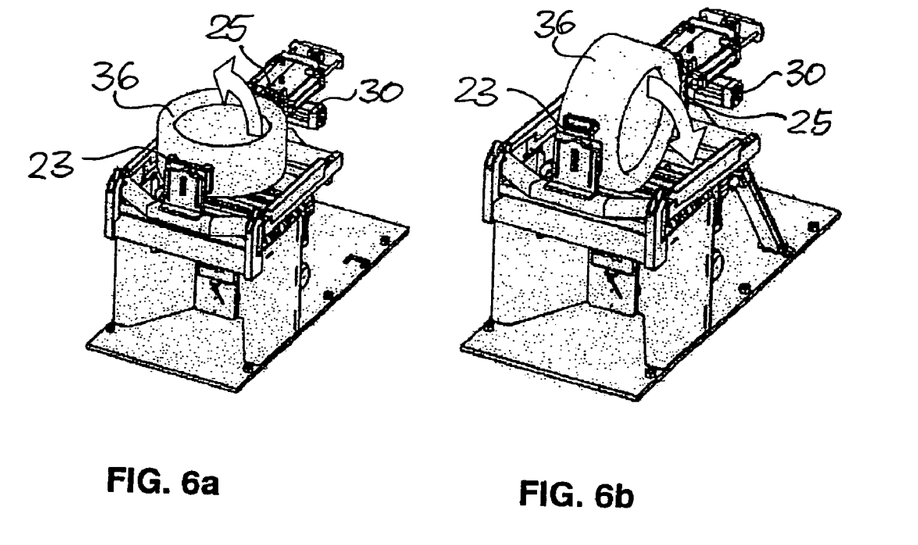
Figure 7:
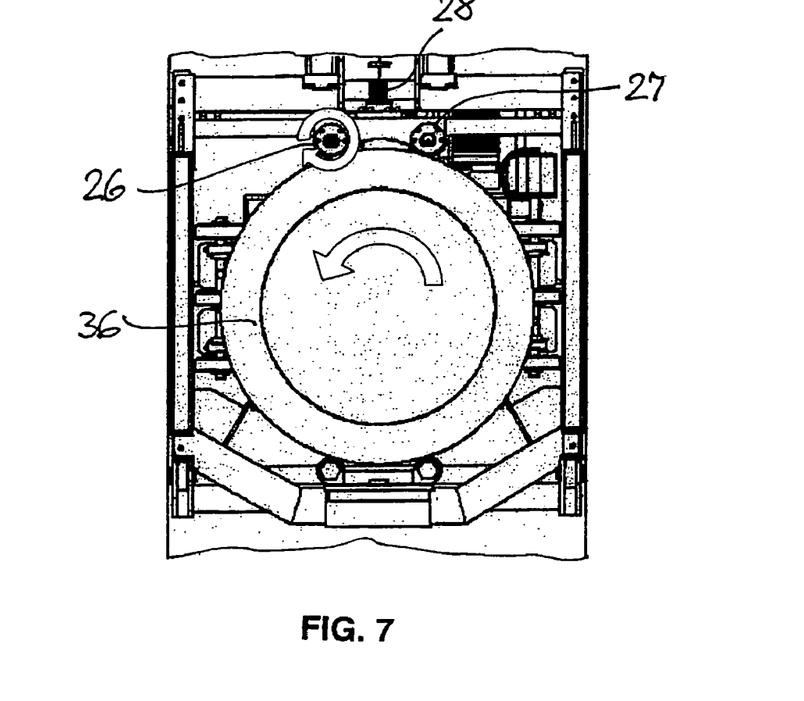
FIG. 7 shows the rotational adjustment of a wheel into the balancing position at the balancing station according to FIG. 1, FIGS. 8a and 8b show the folding up and folding down of a wheel at the balancing station according to FIG. 1.

Subsequently by activating the rotary drive 30 the jaw 25 is rotated through 180° and by this means the wheel 36 turned, see FIG. 6a. The achievement of the end position of the jaw 25 is monitored by an inductive proximity switch on the shaft 28. After turning, or already during turning, the wheel 36 is rotationally adjusted into the balancing position for the second balancing plane by activating the drive of the roller 26. Adherence to the prescribed angle of rotation is monitored by measuring the rotation of the wheel with the aid of the roller 27. FIG. 7 illustrates this procedure.

If automatic rotational adjustment of the wheel is not provided, the position of the wheel can also be adjusted manually. To lower the rotational resistance, the clamping pressure of the clamping device can be switched to an adjustable, lower level.

Figure 8A:
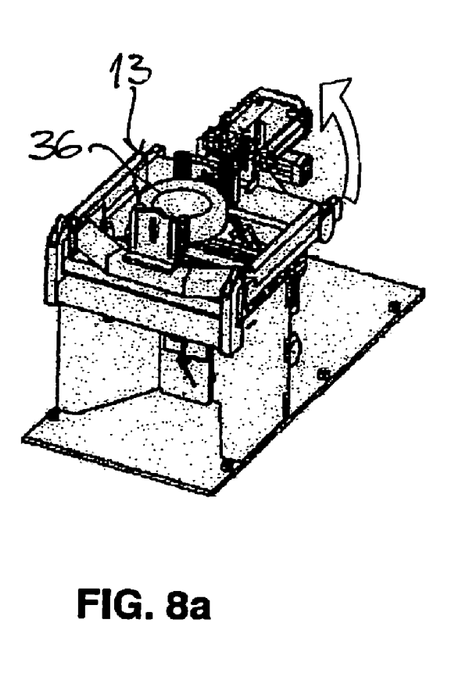
Figure 8B:
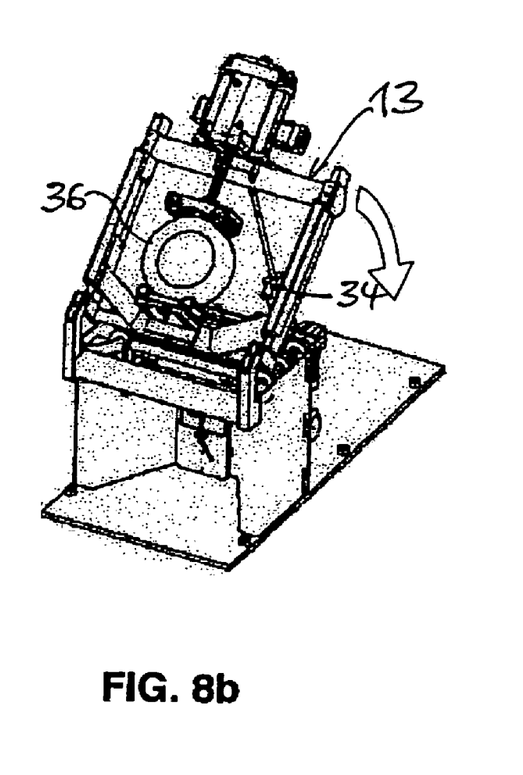

After rotational adjustment, the balancing weight is attached in the second plane. If it is, for example, an adhesive weight for attachment in the inside angle of the flange, the clamping device 13 can initially be driven into the tilted position in order to place the wheel 36 in position, for example at an angle of approximately 40°, and thereby to create favorable ergonomic conditions for attaching the weight. The folding up and down of the wheel is shown in FIGS. 8a and 8b.

After attaching the balance weight in the second plane the clamping device 13 is folded back and the wheel 36 turned back. The elevating table 10 is driven upwards with the conveyor device 6, see FIG. 5b, the transport rollers 11 being lowered at the same time. The clamping device 13 is then detached, see FIG. 4b, and the wheel is conveyed out with the aid of the conveyor device 6.

As the explanations show, the balancing station according to the invention fulfils all the necessary functions for carrying out the normal balancing procedures. The attachment of the balance weights can be performed in a particularly ergonomic manner. By virtue of the combination of individual functions in a single apparatus, the work of construction can be advantageously minimized. The balancing station can be adapted in a simple manner to many sizes of wheel and thereby allows the efficient production of small series instead of complex special solutions. A further advantage lies in the compact external dimensions of the balancing station by which means that retrofitting existing production plant becomes simpler.

The invention claimed is:

1. A balancing station for positioning and holding a vehicle wheel for the attachment of a balance weight comprising:
   (a) clamping device designed for clamping the vehicle wheel at a radial outer wheel periphery, said clamping device comprising:
      (i) at least two mutually opposing first and second jaws designed for pressing against the radial outer wheel periphery and defining a clamping space there-between, said jaws having in common a clamping axis extending through said clamping space and being rotatably mounted around said clamping axis,
      (ii) a drive wherein at least one of said jaws is rotatably drivable around the clamping axis and movable back and forth in a direction of the clamping axis by means of said drive;
   (b) a conveyor device by means of which the vehicle wheel can be conveyed prone between the jaws of the clamping device, wherein the clamping device can be moved into a tilted position wherein the clamping axis is inclined at an angle of at least 30° from a horizontal out of a basic position wherein the clamping axis of the jaws is aligned substantially horizontally.

2. The balancing station according to claim 1, wherein said second jaw is rotatable through an angle of 180° into two end positions limited by stops and can be detained at a first leg in said end positions by friction locking.

3. A balancing station for positioning and holding a vehicle wheel for the attachment of a balance weight comprising:
   (a) clamping device comprising:
      (i) at least two mutually opposing first and second jaws designed for pressing against a wheel periphery and defining a clamping space there-between, said jaws having in common a clamping axis extending through said clamping space and being rotatably mounted around said clamping axis,
      (ii) drive wherein at least one of said jaws is rotatably drivable around the clamping axis and movable back and forth in a direction of the clamping axis by means of said drive; and
      (iii) a frame having two legs;
   (b) a conveyor device by means of which the vehicle wheel can be conveyed prone between the jaws of the clamping device, wherein the clamping device can be moved into a tilted position, wherein the clamping axis is inclined at an angle of at least 30° from the horizontal out of a basic position, wherein the clamping axis of the jaws is aligned substantially horizontally and wherein said two legs extend in a conveying direction on both sides of said conveyor device; and
   c) at least one jaw which is attached to said at least one of said two legs and wherein said frame is pivotable into a tilted position around a swivel axis running transversely to the clamping axis.

4. The balancing station according to claim 3, wherein said at least one leg of said frame extends in the conveying direction, and which is fixable to said frame in a first and a second position, the distance between said at least one leg and an opposing leg being greater in the first position than in the second position.

5. A balancing station for positioning and holding a vehicle wheel for the attachment of a balance weight comprising:
   (a) a clamping device comprising:
      (i) at least one set of mutually opposing first and second jaws;
      (ii) drive wherein said first and second jaws are rotatably mounted around a common clamping axis, with at least one jaw being rotatable and movable back and forth in a direction of the clamping axis by means of said drive,
   b) conveyor device wherein the vehicle wheel can be conveyed prone between said mutually opposing first and second jaws of said clamping device, wherein the clamping device can be moved into a tilted position and wherein the clamping axis is inclined at an angle of at least 30° from a horizontal position, wherein the clamping axis of said mutually opposing first and second jaws are aligned substantially horizontally, and
   wherein the first and second jaws have first and second rollers respectively, said rollers being arranged parallel to each other and forming a contact surface for a wheel periphery.

6. The balancing station according to claim 5, wherein at least said first roller is coupled with said rotary drive for rotational adjustment of the vehicle wheel into a balancing position.

7. The balancing station according to claim 6, wherein the rotary drive is arranged in the first roller.

8. The balancing station according to claim 6, wherein said rotary drive comprises a rotating piston air engine with a reduction gear.

9. The balancing station according to claim 5, further comprising a measuring device coupled to said second roller and, for measuring a rotational angle of the second roller.

10. The balancing station according to claim 9, wherein the second roller is freely rotatable.

11. A balancing station for positioning and holding a vehicle wheel for the attachment of a balance weight comprising:

(a) a clamping device comprising:
  i) at least one set of two mutually opposing first and second jaws designed for pressing against a wheel periphery, said jaws being rotatably mounted around a common clamping axis;
  ii) a drive wherein at least one jaw is rotatable and movable back and forth in a direction of the clamping axis by means of said drive;
b) a conveyor device by means of which the vehicle wheel can be conveyed prone between said jaws of the clamping device, wherein the clamping device can be moved into a tilted position wherein the clamping axis is inclined at an angle of at least 30° from a horizontal position wherein the clamping axis of the jaws is aligned substantially horizontally;
c) a shaft wherein said first jaw is fixed at one end of said shaft which is mounted rotatably and movable longitudinally in a housing;
d) a rotary drive disposed in said housing wherein said shaft is coupled to said rotary drive, and arranged in said housing; and
e) a yoke which is mounted rotatably at an other end of said shaft and transmits thereto a movement of a piston rod of a lifting cylinder which is mounted to the housing parallel to the shaft.

12. A balancing station for positioning and holding a vehicle wheel for the attachment of a balance weight comprising:
  (a) a clamping device comprising:
    (i) at least one set of mutually opposing first and second jaws designed for pressing against a wheel periphery, said jaws being rotatably mounted around a common clamping axis;
    (ii) a drive wherein at least one of said jaws is rotatable and movable back and forth in the direction of the clamping axis by means of said drive;
  (b) a conveyor device by means of which the vehicle wheel can be conveyed prone between the jaws of the clamping device, wherein the clamping device can be moved into a tilted position wherein the clamping axis is inclined at an angle of at least 30° from a horizontal position wherein the clamping axis of the jaws is aligned substantially horizontally; and
  (c) an elevating table wherein the conveyor device is arranged at said elevating table and can be lowered below a conveying plane by lowering said elevating table.

13. The balancing station according to claim 12, wherein said conveyor device is adjacent to a plurality of parallel transport rollers with a rotating axis orientated transversely to the clamping axis, said plurality of parallel transport rollers being mounted on a lift bolster which is in a lower position wherein said plurality of parallel transport rollers are provided below the conveying plane of the conveyor device and are movable into an upper position in which said plurality of parallel transport rollers protrude beyond the conveying plane of the conveyor device.

14. The balancing station according to claim 13, wherein said lift bolster is mounted at, and abuts against said elevating table.

15. A balancing station for positioning and holding a vehicle wheel for the attachment of a balance weight comprising:
  (a) a clamping device comprising:
    (i) at least one set of mutually opposing first and second jaws designed for pressing against a wheel periphery, said jaws being rotatably mounted around a common clamping axis;
    (ii) a drive for driving said jaws with at least one thereof being rotatable and movable back and forth in a direction of the clamping axis by means of said drive; and
  (b) a conveyor device by means of which the vehicle wheel can be conveyed prone between the jaws of the clamping device, wherein the clamping device can be moved into tilted position wherein the clamping axis is inclined at an angle of at least 30° from a horizontal position wherein the clamping axis of the jaws is aligned substantially horizontally, and wherein the conveyor device has at least two conveyor belts arranged at a distance from one another.

16. A balancing station for positioning and holding a vehicle wheel for the attachment of a balance weight comprising:
  (a) a clamping device comprising:
    (i) at least one set of mutually opposing first and second jaws designed for pressing against wheel periphery, said jaws being rotatably mounted around a common clamping axis, and
    (ii) a drive for at least one of said jaws rotating and moving back and forth in the direction of the clamping axis by means of said drive, and
  (b) conveyor device by means of which the vehicle wheel can be conveyed prone between the jaws of the clamping device, wherein said clamping device can be moved into a tilted position wherein the clamping axis is inclined at an angle of at least 30° from the horizontal out of a basic position wherein said clamping axis of the jaws is aligned substantially horizontally, and wherein a fence roller is arranged at a leading and/or trailing edge of the conveyor device.

* * * * *

UNITED STATES PATENT AND TRADEMARK OFFICE
CERTIFICATE OF CORRECTION

PATENT NO. : 7,377,165 B2  Page 1 of 1
APPLICATION NO. : 10/529506
DATED : May 27, 2008
INVENTOR(S) : Rogalla et al.

It is certified that error appears in the above-identified patent and that said Letters Patent is hereby corrected as shown below:

On the cover page, column 1, item [73], please change "Schenck RoTek GmbH" to correctly read:

--Schenck RoTec GmbH--.

Signed and Sealed this

Nineteenth Day of August, 2008

JON W. DUDAS
*Director of the United States Patent and Trademark Office*